United States Patent [19]
Klemba et al.

[11] Patent Number: 5,710,814
[45] Date of Patent: Jan. 20, 1998

[54] CRYPTOGRAPHIC UNIT TOUCH POINT LOGIC

[75] Inventors: Keith Klemba; Roger Merkling, both of Palo Alto, Calif.

[73] Assignee: Cheyenne Property Trust, San Francisco, Calif.

[21] Appl. No.: 685,076

[22] Filed: Jul. 23, 1996

[51] Int. Cl.[6] .................................................. H04K 1/00
[52] U.S. Cl. ........................... 380/9; 380/25; 380/28; 380/49
[58] Field of Search ............................ 380/9, 23, 24, 380/25, 28, 49, 3, 4

[56] References Cited

U.S. PATENT DOCUMENTS

| | | | |
|---|---|---|---|
| 5,099,516 | 3/1992 | Durkin et al. | 380/4 |
| 5,123,045 | 6/1992 | Ostrovsky et al. | 380/4 |
| 5,224,166 | 6/1993 | Hartman, Jr. | 380/4 |
| 5,276,735 | 1/1994 | Boebert et al. | 380/4 |
| 5,301,231 | 4/1994 | Abraham et al. | 380/4 |
| 5,315,655 | 5/1994 | Chaplin | 380/4 |
| 5,325,430 | 6/1994 | Smyth et al. | 380/4 |
| 5,412,717 | 5/1995 | Fischer | 380/4 |
| 5,530,752 | 6/1996 | Rubin | 380/4 |
| 5,541,991 | 7/1996 | Benson et al. | 380/4 |
| 5,544,244 | 8/1996 | Ogura | 380/4 |
| 5,600,726 | 2/1997 | Morgan et al. | 380/4 |
| 5,615,381 | 3/1997 | Iijima | 380/4 |

Primary Examiner—David C. Cain

[57] ABSTRACT

Cryptographic hardware is provided that is disabled at the time of shipment and that is selectively enabled in a trusted fashion using methods and interfaces that may be controlled by and governed by government policy in strict compliance with existing and future legislation. A given cryptographic algorithm is disabled/enabled at several points, referred to as Touch Points, and referred to collectively as Touch Point Logic. Because attributes of each touch point are satisfied by providing data that are referred to as Touch Point Data, manufactures are allowed to include disabled cryptographic hardware in their products and governments are provided with the ability to enable this cryptographic hardware only in compliance with governing legislation.

48 Claims, 13 Drawing Sheets

CRYPTOGRAPHIC UNIT TOUCH POINT LOGIC

BACKGROUND OF THE INVENTION

1. Technical Field

The invention relates to cryptography. More particularly, the invention relates to a cryptographic unit for use with an international cryptography framework.

2. Description of the Prior Art

Customers of large computer systems are typically multinational corporations that want to purchase enterprise wide computer based solutions. The distributed nature of such organizations requires them to use public international communications services to transport data throughout their organization. Naturally, they are concerned about the security of their communications and seek to use modern end-to-end cryptographic facilities to assure privacy and data integrity.

The use of cryptography in communications is governed by national policy and unfortunately, national policies differ with respect to such use. Each national policy is developed independently, generally with a more national emphasis rather than international considerations. There are standards groups that are seeking to develop a common cryptographic algorithm suitable for international cryptography. However, the issue of international cryptographic standards is not a technical problem, but rather it is a political issue that has national sovereignty at its heart. As such, it is not realistic to expect the different national cryptography policies to come into alignment by a technical standardization process.

The issue of national interests in cryptography is a particular concern of companies that manufacture open-standards-based information technology products for a worldwide market. The market expects these products to be secure. Yet, more and more consumers of these products are themselves multinational and look to the manufacturers to help them resolve the international cryptography issues inhibiting their worldwide information technology development. The persistence of unresolved differences and export restrictions in national cryptography policies has an adverse impact on international market growth for secure open computing products. Thus, it would be helpful to provide an international framework that provides global information technology products featuring common security elements, while respecting the independent development of national cryptography policies.

Nations have reasons for adopting policies that govern cryptography. Often these reasons have to do with law enforcement and national security issues. Within each country there can be debates between the government and the people as to the rightness and acceptability of these policies. Rather than engage in these debates or try to forecast their outcome, it is more practical to accept the sovereign right of each nation to establish an independent policy governing cryptography in communication.

Policies governing national cryptography not only express the will of the people and government, but also embrace certain technologies that facilitate cryptography. Technology choice is certainly one area where standardization can play a role. However, as indicated earlier this is not solely a technical problem, such that selection of common cryptographic technologies alone can not resolve the national policy differences. Consequently, it would be useful to provide a common, accepted cryptography framework, wherein independent technology and policy choices can be made in a way that still enables international cryptographic communications consistent with these policies.

A four-part technology framework that supports international cryptography, which includes a national flag card, a cryptographic unit, a host system, and a network security server is disclosed by K. Klemba, R. Merckling. *International Cryptography Framework*, in a copending U.S. patent application Ser. No. 08/401,588, which was filed on 8, Mar. 1995. Three of these four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements.

The framework supports the design, implementation, and operational elements of any and all national policies, while unifying the design, development, and operation of independent national security policies. The framework thus gives standard form to the service elements of national security policies, where such service elements include such things as hardware form factors, communication protocols, and on-line and off-line data definitions.

Critical to the implementation of the framework is the provision of a fundamental technology that allows the production of the various service elements. While various implementations of the service elements are within the skill of those versed in the relevant art, there exists a need for specific improvements to the state of the art if the full potential of the framework is to be realized.

SUMMARY OF THE INVENTION

The international cryptography framework allows manufacturers to comply with varying national laws governing the distribution of cryptographic capabilities. In particular, such a framework makes it possible to ship worldwide cryptographic capabilities in all types of information processing devices (e.g. printers, palm-tops). Within the framework, a cryptographic unit contains several cryptographic methods (e.g. DES, RSA, MD5). These methods are disabled in predetermined ways at several points, referred to as Touch Points (TP).

At each TP there is dynamic state enabling logic that forms what is referred to as a Touch Point Gate (TPG). TPGs require regular reconfiguration to maintain the TP in the enabled state. A TP may also have constraint data associated with it. These constraint data are referred to as Touch Point Data (TPD) and provide parametric control over the functioning of the method.

Each cryptographic method is controlled by several TPs within that method. All the TPGs for a given cryptographic method must be in the enabled state to activate that method. Because the enabling state of each TPG is dynamic, a constant refresh and state determination is required. This refresh is accomplished by what is referred to as a Touch Point Heartbeat (TPH), which is established between the CU and the National Flag Card (also referred to as a Policy Card) service element of international cryptography framework. All aspects of Touch Points taken together are referred to as Touch Point Logic (TPL).

DETAILED DESCRIPTION OF THE INVENTION

National cryptography policy often varies by industry segment, political climate, and/or message function. This makes it difficult to assign one uniform policy across all industries for all time. Consequently, the flexibility of a cryptography framework that incorporates a national flag card is very attractive. The invention is therefore directed to resolving problems surrounding international cryptography. It presents a cryptography unit for a framework that may be used to support the design and development of any national policy regarding cryptography. Thus, the invention implements a "gatekeeper" function by which both the use of cryptography and the use of a system protected by the cryptography are controlled in a trusted and tamper proof manner.

Figure 1:
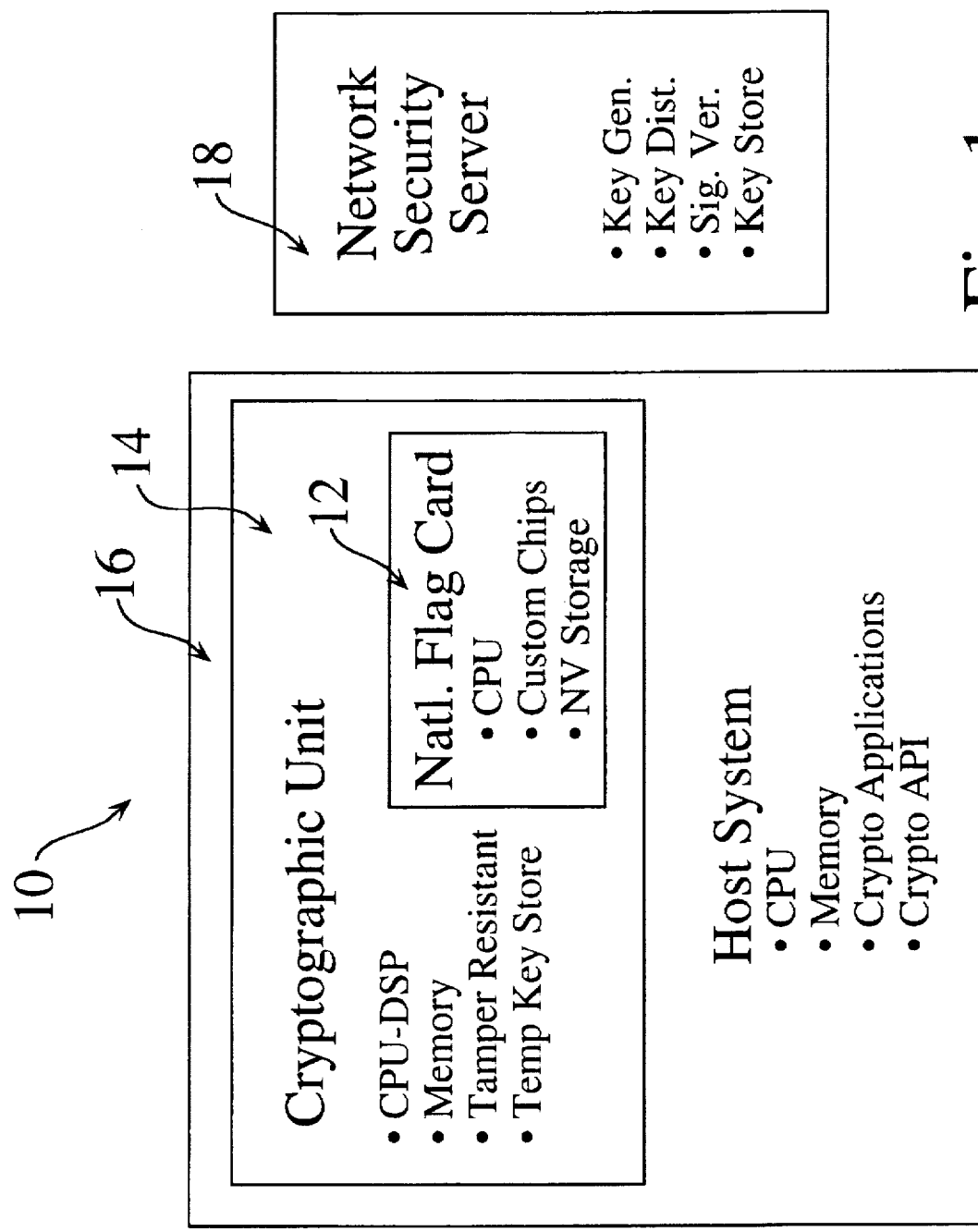
FIG. 1 is a block diagram of an international cryptography framework, including a national flag card, a cryptographic unit, a host system, and a network security server.

The cryptography unit that comprises the invention preferably resides in an international cryptography framework that has four service elements, each offering different types of services. FIG. 1 is a block diagram of the international cryptography framework (ICF) 10, including a national flag card 12, a cryptographic unit 14, a host system 16, and a network security server 18. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. For purposes of the discussion herein, the National Flag Card is also referred to as the policy because it provides the discipline that exerts a national cryptography policy.

The fourth service element, a Network Security Server (NSS), provides a range of different security services including verification of the other three service elements, and thus acts as a trusted third party. Messages encrypted using the proposed framework carry an electronic stamp identifying the national cryptography policy under which the message was encrypted. The Network Security Server also provides stamp verification services for message handling systems.

The ICF allows manufacturers to comply with varying national laws governing the distribution of cryptographic capabilities. In particular, such a framework makes it possible to ship worldwide cryptographic capabilities in all types of information processing devices (e.g. printers, palmtops).

Within the ICF a CU contains several cryptographic methods (e.g. DES, RSA, MD5). These methods are disabled in predetermined ways at several points, referred to as Touch Points (TP). At each TP there is dynamic state enabling logic that forms what is referred to as a Touch Point Gate (TPG). TPGs require regular reconfiguration to maintain the TP in an enabled state. A TP may also have constraint data associated with it. These constraint data are referred to as Touch Point Data (TPD), and provide parametric control over the functioning of each TP.

Figure 2:
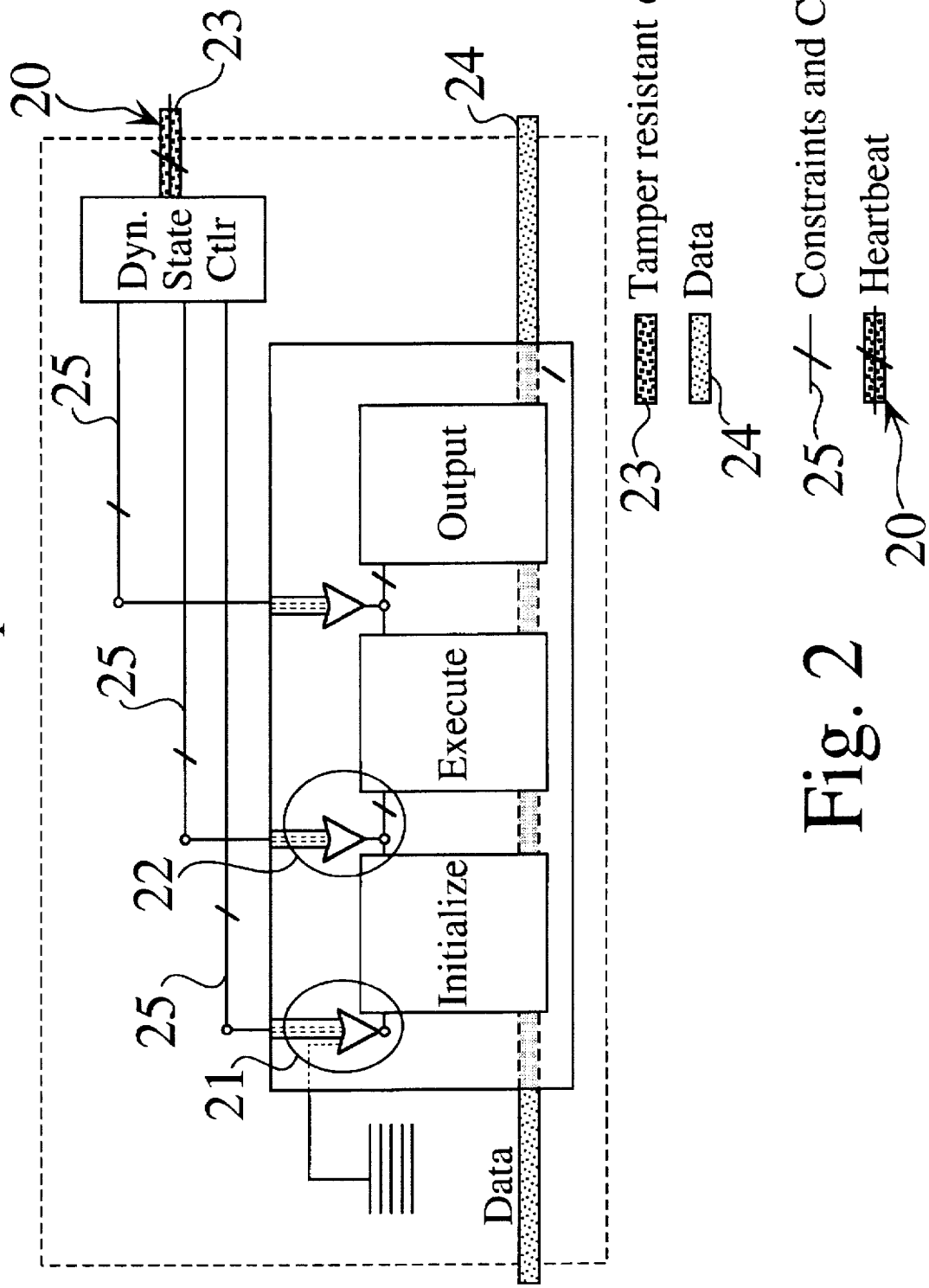
FIG. 2 is a schematic diagram showing a generic touch point principle according to the invention.

FIG. 2 is a schematic diagram showing a generic touch point principle according to the invention. The legend at the lower right hand corner of the figure (as with FIG. 3) shows a tamper resistant channel 23, data 24, constraints and control, and a heartbeat 20.

Critical to the invention is the provision of cryptography that is intentionally dormant and that cannot be coerced to work without the presence of a link to a separate policy. The invention specifically concerns the manner in which the cryptography is dormant and how it is reassembled in a way that maintains the required linkage, such that it is not possible to start the cryptography, then take the linkage away and keep the cryptography running in the absence of such linkage. Accordingly, the invention includes a heartbeat 20 that requires the presence of such linkage at all times. Further, the cryptographic unit must be implemented in a way that recognizes that society demands and business requires that all aspects of the cryptographic unit must be observable. That is, it must be possible to know and see everything inside the cryptographic unit. These concepts are fundamental to the herein disclosed cryptographic unit.

One feature of the invention provides different policy cards that enable the cryptographic unit in different ways, such that the cryptographic unit may have different modes of operation. The features of the cryptographic unit that allow the system to download new functionality from, for example, a network security server must provide that only dormant cryptography that can only be activated in an appropriate way by a separate policy may be downloaded.

The touchpoint technology is presently implemented in a gate array which typically allows several of the touchpoints for a single cryptographic method, e.g. DES. For purposes of the discussion herein, the word 'method' refers to a cryptographic algorithm, such as DES and RSA.

Other embodiments of the invention allow gates from different methods to be mixed, such that several bits which represent the several gates are unknown with regard to particular pattern that they implement. The gates can be set in a pattern that causes a gradual decay in functionality in the event of a breach of security, rather than breaking all of the several gates at once. Alternatively, a gate may be independently picked and randomly enabled. Thus, a pattern may be chosen to increase further the difficulty of detecting and defeating the touchpoint methodology. Thus, the invention allows the combination of various methods and touchpoints, e.g. as many as 100–200 touchpoints, in a cryptographic unit where any combination or selection of these touchpoints may be activated at any time.

The heartbeat is an on-going protocol that enables the cryptography. For example, in some embodiments of the invention the heartbeat may be implemented in a challenge/ response protocol. A challenge is regularly posted by the cryptographic unit. As a consequence, the policy must be present. If the policy is busy or not present, then the cryptography gradually decays because touchpoints are starting to fall off because they are not receiving the responses that they need to remain enabled. Accordingly, the whole system is dependent on the policy. If the policy is removed, independent of whatever else is going on in the system, the functionality of the hardware starts to breakdown.

The rate of a heartbeat is dependent on the policy and is a part of essentially additional touchpoint data that are supplied by data policy card. The touchpoint data are typically provided to the cryptographic unit just once. In one embodiment, when the cryptographic unit and the policy are initialized, the policy sends its touchpoint data across once because that data does not change. However, the gate logic in the cryptographic unit is always changing.

One of the touchpoint data sent to the cryptographic unit determines the frequency at which the policy expects the cryptographic unit to send requests. This exchange of data works both ways. For example, if the cryptographic unit fails to send challenges to the policy, i.e. where the cryptographic unit is started once and thereafter no more challenges are sent to the policy, then the policy detects that the cryptographic unit does not play by the rules. Thus, if the policy told the cryptographic unit to send a response every second, but it does not send a response every second, then the policy breaks down the cryptographic function. Further, if the cryptographic unit ever powers off, the policy does not let it power back on.

The policy maintains its state and if the cryptographic unit refuses to comply with a policy request, then the inverse takes place. When the power to the cryptographic unit is off, the policy no longer recognizes it. The powering on and off is an initialization sequence, or activation sequence (as discussed in greater detail below). If the system is up and running, the policy and the cryptographic unit force an activation sequence at regular intervals. At some point, even if the cryptographic unit has been tampered with such that it may appear to be a legitimate system element, it must still satisfy an initialization phase, which is a power reset to the cryptographic unit and there is no way that the cryptographic unit can get around this requirement.

The preferred embodiment of the invention places the cryptographic unit in a separate hardware unit from that of the policy. While the cryptographic function could be implemented in software rather than hardware, it is very difficult to place inaccessible touchpoints into a software implementation of a method, unless the software is loaded into a protected piece of hardware. Thus, it is preferred that all functionality relating to the method be placed in a separate piece of hardware that is protected and tamper-resistant.

When the method is dormant, it is broken at various places. For example, it is possible to take a method, such as DES, and break it. Thus, the preferred embodiment of the invention breaks DES in several places. Each of those places is a touchpoint.

In the DES algorithm, very near the top, it is necessary to load an initialization vector 21 for the algorithm. Typically, the initialization vector is loaded with a master key or a combination key, or with some well known or shared secret.

This becomes a touchpoint 22. At that load process, it is possible to either limit the size of the value that is loaded or to fix the load such that, if the policy says that as a matter of government policy it is necessary that all initialization vectors begin with a certain pattern, then indeed that pattern is the pattern with which all initialization vectors start. This is an example of touchpoint data.

The data are typically a mask of length or a mask of content that says, "I don't care what you're going to load, this is what we're really going to load." Or, "I don't care what size you think you're going to load, we're going to load this size." Thus, a touchpoint can limit the data in magnitude or limit it in content. Such limits are dictated by the policy. All the cryptographic unit does is provide a register pair, a mask (e.g. an AND mask and an OR mask), two registers, and another aspect called touchpoint gate. The touchpoint data are loaded into these registers to activate that touchpoint of the cryptographic unit.

A touchpoint gate, for example with regard to DES, breaks the algorithm. Thus, the invention provides that a critical gate, i.e. a gate that is holding the processing until the data registers are loaded, can be treated as a tri-state gate, such that there are parametric controls that enable the gate. The gate is not a typical a binary gate that operates in a normal sense of timing. The system requires specific controls for the gate to be activated. Absent such control, or if the control is confused or inconsistent, the gate no longer functions.

Figure 3:
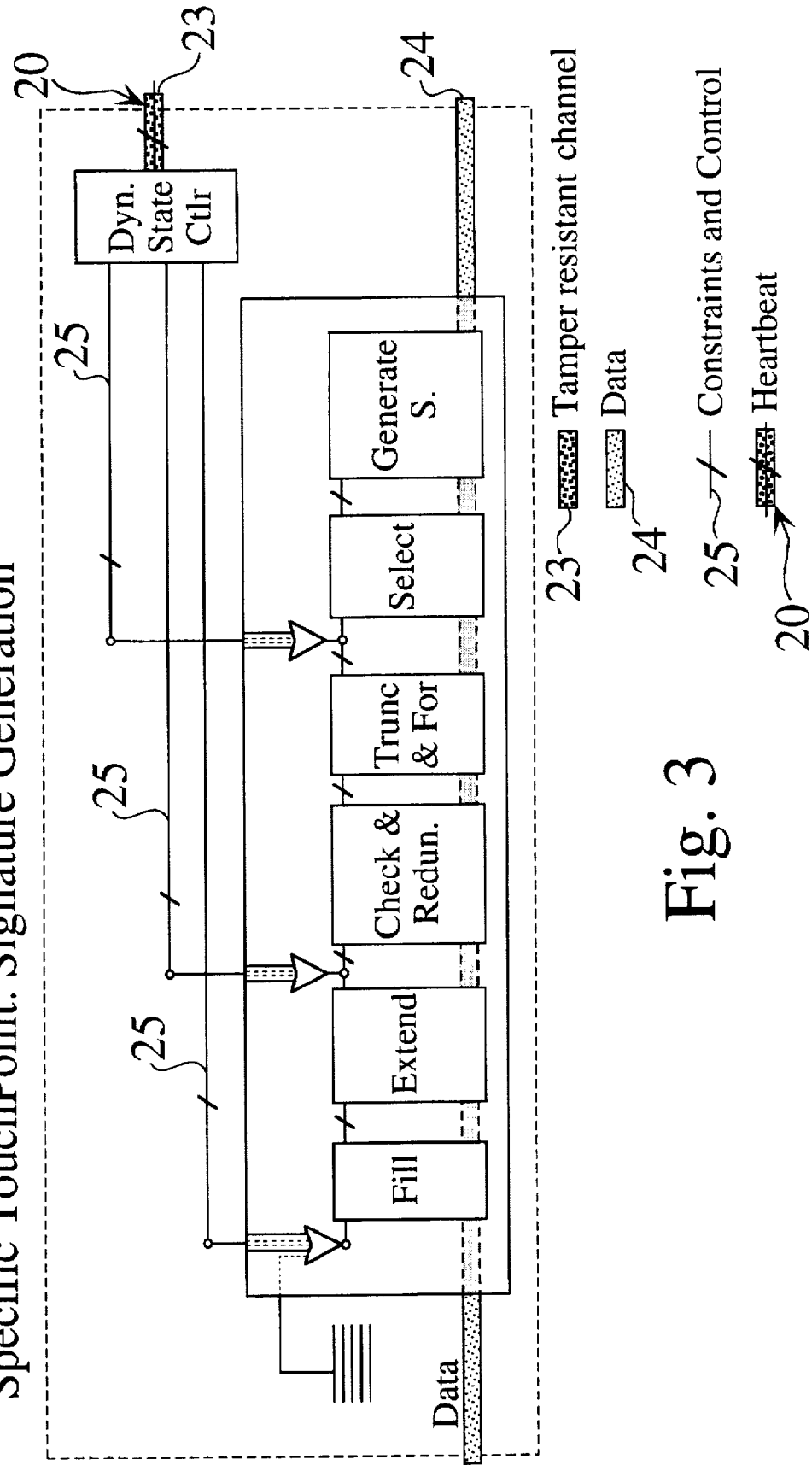
FIG. 3 is a schematic diagram showing a specific touch point that provides signature generation according to the invention.

FIG. 3 is a schematic diagram showing a specific touch point that provides signature generation according to the invention. Breaking the algorithm from any even literal function, even though the data are in place, prevents operation of the function because the gate is dormant. Thus, DES is preferably broken in several places. Even if it were possible to coerce one gate, it is still necessary to find all of the other such gates to activate the cryptographic unit. As the cost per TPG decreases, it is possible to increase the number of TPGs applied to any method.

With regard to the touchpoint gate as a flow mechanism, it is inefficient to create a gate that is a binary state gate or a static gate. If each touch point gate requires the same unchanging inputs to produce the output that is required to enable the cryptographic method concerned, it would be possible to set the inputs as needed and thereby enable the method, even in the absence of the policy. For this reason, each touch point gate is dynamically reconfigurable (as discussed in greater detail below), i.e. each gate is reconfigured at intervals (not necessarily regular) such that the inputs needed to cause the gate to enable the cryptographic method also change. This reconfiguration is controlled by the heartbeat process (discussed above), where the policy is challenged, for example at each heartbeat, to produce an appropriate response that enables the gate in its reconfigured state, and thereby continue to enable the cryptographic method. For example, if the gate is a tri-state gate, it is possible to a laser etch the gate and set it permanently at a one or zero. It is further possible to locate the next gates and also set them to a one or zero. Therefore, it is necessary to create a complex gate that responds to random numbers, referred to herein as a challenge, where the cryptographic unit provides an appropriate response. Thus, the preferred embodiment of the invention requires a challenge and response between the cryptographic unit and the policy. The cryptographic unit creates a random number, for example a binary random number, that becomes the challenge that is sent to the policy. The challenge is encrypted before it is sent to the policy. The policy decrypts the challenge, examines the pattern, takes the complement of the pattern, and sends the complement pattern to the cryptographic unit after it encrypts the message. The cryptographic unit decrypts the message and gets back a pattern that becomes the response if the pattern is the pattern that is expected by the cryptographic unit. In this way, the gate can be regularly reconfigured (e.g. by the random number), and the touchpoint is maintained in an enabled state if the policy is able to respond to the cryptographic unit's challenge (i.e. the challenge is a valid challenge).

The cryptographic unit is a hardware solution. The functioning of the method within the cryptographic unit is controlled by the touchpoints. One aspect of the invention is that the cryptographic unit may be provided in the form factor of a PCMCIA card, in the form factor of a chip that is soldered into a motherboard, or even in the form factor of a supercell, where the supercell may migrate right on to the CPU. In all embodiments of the invention, the cryptographic unit is a trusted and tamper-resistant component of the system.

The fact that the cryptographic unit is fully dissectable, i.e. fully exposed, is unique in the industry. The state of the art, e.g. the Clipper chip, is operated purely from the idea that there are black cells that cannot be observed or reviewed. This is not the case with the cryptographic unit herein described, where it is possible to see everything in the logic flow, i.e. at what point touchpoint data is applied, but there is no path through which data may escape. There are no registers in the cryptographic unit that take snapshots of the data, or hold the data and share it with the government. This feature of the invention provides a strong differentiator in terms of being able to build something that may be shipped without export controls. The invention also allows cryptographic units to be manufactured by any number of vendors without a concern off a loss of system integrity or security. Thus, the cryptographic unit provides a generic engine where the policy functions as a "gatekeeper" that determines where and how security functions are provided.

As discussed in greater detail below, the CU is not personalized per se. Rather, it is activated. That is, the CU has a serial number, the policies are directed at that serial number, i.e. the policies are directed to work for a particular cryptographic unit. Once the policy and the cryptographic unit are wedded, the touchpoint data migrates across, and the two become intimately bound. If the policy was removed from the cryptographic unit and replaced with another policy nothing would happen whatsoever. The system would not even perform an initialization. The policy cannot be used anywhere else, and the cryptographic unit cannot be separated from this policy.

If the user of the cryptographic unit travels to another country and buys a policy for that country, then such user may take the current policy, e.g. the United States policy, out and put in, for example, a German policy, and the German policy and cryptographic unit would work together. Thus, the policy and the cryptographic unit are bound in a particular way that is different in each case where each government determines its own cryptography policy.

The state of the art provides one policy, i.e. a static situation, with one policy governing all use of the cryptography in the unit. In contrast, the invention herein adapts readily to any policy or policies. Moreover the invention provides more than one dimension at a time. For example, it is possible to run triple DES for financial service applications that have no Key Escrow requirement, and at the same time use e-mail with Key Escrow and 40-bit DES or 56-bit DES. The cryptographic unit can do both types of cryptography at the same time because a particular policy may be flexible enough to do that. What makes this work is that when data are presented for encryption, a credential is provided that notes a certain cryptographic class of service. The cryptographic unit validates that it recognizes that class of service as, e.g. triple DES and it recognizes from its policy card that such class of service is authorized for this application domain. The policy then sets the appropriate touchpoint data at the various points associated with that class of service. The next piece of data may have a different credential, i.e. a different class of service.

Basic Architecture Assumptions

The CU does not provide users with any cryptographic functions in the absence of an NFC;

The NFC has no access to user data that is processed within the CU;

The CU or CUs controlled by a given NFC is deterministic, i.e. every event, act, and decision of the CU is the inevitable consequence of antecedents that are independent of the NFC;

The TPD applied to a given method are determined by credentials presented by the application requesting cryptographic services;

The CU, NFC activation sequence may, from time-to-time, require participation of the ICF Network Security Server Element; and Primary threat protection is provided against unauthorized activation of cryptographic functions.

System Overview
Introduction

A CU is an essential trusted element of the ICF and provides basic cryptographic mechanisms in a tamper resistant form factor. A CU which is compliant with an ICF specification evolves through three self-contained stages, identified as the Manufacturing and Distribution stage, the Activation stage, and the Operation stage. The ICF architecture has a different impact on the CU in each of these stages:

During the CU Manufacturing and Distribution stage, an emphasis is put on the integrity and analytical exposure of the CU logic and functional specifications. Touch point data are not installed in this stage. In fact, such data are not generally available to a CU manufacturer.

During the Activation stage, the CU is connected to an NFC to establish a mutually authenticated private session that serves to transfer TPD and support the TPH.

Finally, during the Operation stage the CU is functional and performance becomes the primary focus.

Manufacturing and Distribution Stage

The following example shows an embodiment of the invention that resolves mutual authentication between the cryptographic unit and the policy using a secret key mechanism. Other embodiments of the invention may use a public key mechanism to accomplish such resolution.

STEP 1

The manufacturer is issued a PvtKey(CU_Manufacturer) and a CU manufacturer's certificate by a certification authority approved by a Security Domain Authority (SDA). A CU manufacturer's certificate contains, among other things, a public key, referred to as a PubKey(CU_Manufacturer). Public/private keys belong to a so-called key pair used by an asymmetric encryption system, where one key is used to encrypt or sign and the other key is used to decrypt or verify that it is the authentic signature. The verification key is the public key, while the encryption key is the private key, which is stored secretly. The strength of the asymmetric system relies on the difficulty of re-engineering the private key from the public key.

The legitimate CU manufacturer takes the following actions:

Generates a unique CU serial number for each CU on the production line.

Assigns a secret key, SrtKey(CU_Lot), for each lot (e.g. 2000 CUs) of CUs produced. Secret keys belong to the symmetric encryption system, where two entities set up trust because they rely on a shared secret.

Uses a diversification algorithm to generate SrtKey(CU) as a function of the CU serial number and the SrtKey(CU_Lot). Such an algorithm generates a unique secret key for each CU using the CUs serial number and a secret lot key.

Loads fully capable but dormant cryptographic methods (e.g. DES, RSA, MD5, Diffie-Hellman) into the CU on the production line. The cryptography is made dormant using the touch point logic. Other cryptographic methods may also be installed, such that the range of potential strength for these algorithms is increased.

Loads the following information into each CU on the production line. The information is installed with tamper protection to avoid unauthorized disclosure of these items:

CU manufacturer certificate ID

Pvt Key(CU_Manufacturer)

CU serial number

SrtKey(CU)

STEP 2

For each lot of CUs built, the CU manufacturer shares the following information with the Security Domain Authority (s):

CU serial numbers in this lot

SrtKey(CU_Lot)

Diversification algorithm

CU manufacturer's certificate

STEP 3

A customer orders a CU from a legitimate CU manufacturer or distribution channel for CUs.

STEP 4

Upon receipt of an order, a CU is sent (perhaps exported) to the customer, together with an NFC order form.

STEP 5

The customer fills out the NFC order form and sends it to one or more Security Domain Authority(s).

The principle items found on the NFC order form are:

CU manufacturer certificate ID

CU serial number

Customer chosen one-time shipping PIN

HostsSystem ID

Application Domain Authority ID

Application certificate ID

Application description

Desired attributes (e.g. expiration date, number of uses, types and strength of cryptography requested)

STEP 6

The Security Domain Authority (SDA) receives an NFC order form. Using information from the NFC order form, the SDA (or it's authorized agent) can activate (i.e. personalize) an NFC to meet this customer's request. The SDA uses the CU manufacturer certificate ID and the CU serial number to identify the diversification algorithm and SrtKey(CU_Lot).

Using this information, the SDA generates SrtKey(CU). It is assumed that the domain authority has access to uninitialized (i.e. unpersonalized) NFCs built to their specifications.

The SDA then initializes an NFC by installing the following information:

CU serial number, SrtKey(CU), PubKey(CU_Manufacturer)

PIN(1Time_Shipping) SDA Authorization Information (1-n)

SDA IDs ADA Authorization (1-n)

ADA certificate ID

PubKey(ADA)

Class of Service Authorization Information (1-n)

Class of service ID

[Authorization Rules]PvtKey(SDA)

[NSS attributes]PvtKey(SDA)

[{CU Touch Point Data}SrtKey(CU)]PvtKey(SDA).

This process permanently locks the NFC from any further modification. The NFC is locked for transport using a customer supplied one-time personal identification number (PIN) and shipped to the requesting customer.

In alternative embodiments of the invention, this entire step is performed on-line, where the customer installs an NFC that is initialized with only an SDA ID, and where a cooperating NSS initializes all other information via the network. It is also possible to update or add SDAs, ADAs, CoSs, CoS data, or Touch Point Data on line from an NSS. Further, the invention may provide that a CU is functionally destroyed, for example if tampering is detected, by altering the critical initialization attributes, such as ID, in the CU, thereby rendering the CU forever unusable.

STEP 7

The customer receives an NFC from the SDA. The customer supplied PIN(1Time_Shipping) protects the NFC during transport to insure that only the original customer (i.e. the customer who is filling out the NFC order form) can use this NFC.

STEP 8

The customer installs the NFC into an NFC reader device. Generally, the NFC reader device is incorporated into the CU. The CU is then installed into the HS, thus completing the manufacture and distribution stage for these ICF elements.

Activation Stage

Figure 4:
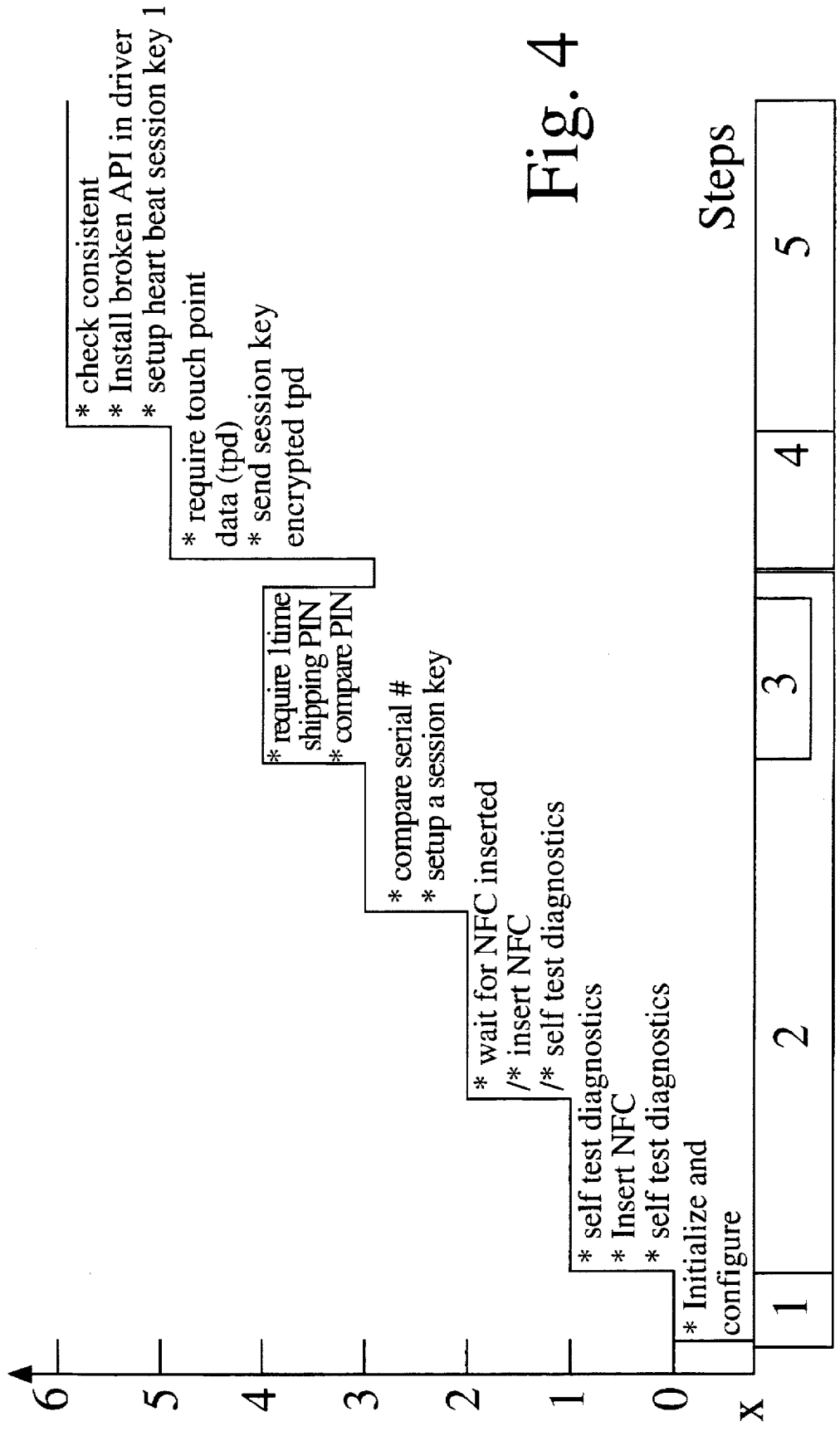
FIG. 4 is a timing diagram showing behavior of a cryptographic unit during an activation stage according to the invention.

FIG. 4 is a timing diagram showing behavior of a cryptographic unit during an activation stage according to the invention. During the activation stage, the cryptographic unit operates in accordance with the following model:

Basic Principles

The following concepts apply:

The CU operates based on steps and modes.

A mode is an internal state of the CU. A CU can fall back into previous modes based on examples such as loss of trust, failure from the NFC to engage a challenge, or loss of the vital heartbeat. The current mode that a CU is running is accessible to the external world through a status check.

A step is the minimum discrete sequence a CU controls when in a given mode.

The CU must be in Mode 3 and in Step 4 (see FIG. 4) to accept the transfer of the initial TPD from the NFC.

A disabled CU is a hardware unit that has a fully functional silicon layout (see FIG. 13), and that has the potential to execute cryptographic functions. However, the composing methods which form the cryptographic functions are disabled by the TouchPoint Gates.

As soon as the NFC is taken out of a reader slot, the CU operates in a dormant mode.

Definitions

This section introduces the theoretical background required for the definitions as well as the set of tools used to install the touch point data.

The following definitions are derived from the ISO/IEC 10181-1 definitions and used for interpretation herein:

security authority
- responsible for the implementation of a security policy. In the preferred embodiment of the invention, the first security authority of concern is the NSA, i.e. the U.S. National Security Agency.

security policy
- a set of rules that constrain the use of cryptographic functions within a domain of applications. In connection with the invention herein, these are the rules by which the security function is obtained to the satisfaction of the security authority, as represented by the TouchPoint life cycle. In the preferred embodiment of the invention, only the rules which apply to particular security domains are considered These identified security domains are France, the UK, Germany, and Japan. The respective authorities are SCSSI, CSG, BSI, and MITL security domain
- a set of elements under a given security policy administered by a single security authority for some specific security relevant activities. For example, where the primary security domain considered is the United States, the elements to be controlled are the CU's.

rules
- these are derived from the security policy. They translate a constraint on activities and elements. As an example of such a rule: constrain the DES encryption mechanism for applications selected by an ADA Application Domain Authority of type A to international transfers with key length of 128 bit.
- A rule—ri—is the result of the following formula:

r1=T(policy1)r3=(r1 AND r2) OR T(policy3)

r2=T(policy2)r4= . . .

TouchPoint data (tpd)
- the result of the translation of the natural language expressed semantic of explicit and precise rules (ri) into a unique cipher stream. More precisely, the tpd makes a rule specific to a cryptographic function. Moreover, it provides parametric control over a TouchPoint at a specific time, referred to as a tdpi. The tpdi is the translation at time t0 of a rule rk, for a specific TouchPoint. Once the tpdi is loaded into an NFC, a suite of tpdis can enable any application that has an equivalent allowance, referred to as the cryptographic class of service (COS), from its Application Domain Authority (ADA). The tpdi translation can be represented by the following formula:

For an algorithm decomposed into four TouchPoints tp1, tp2, tp3, and tp4:

tpd1 = F1 (t0, r1, tp1), where F1 stands for a cryptographic or transform function
tpd2 = F1 (t0, r1, tp2),
tpd3 = F1 (t0, r1, tp3), -continued tpd4 = F1 (t0, r1, tp4),
tpd5 = F1 (t0, r2, tp5),
.etc . . .

By extension, NFCs are precast by the SDA with all potential cryptography classes of services to enable the ADA to control the use of cryptography within its realm. The tpdi's are encapsulated per class of service before they are encrypted and signed with the SDA Private key, as specified in STEP 6 above.

COS
- a cryptography class of service is an external identifier that is shared between one SDA and the belonging ADAs used to reference the implementation of a rule. A given rule i becomes a class of service i as soon as it is offered to an ADA to be assigned as a cryptographic function for a class of applications.

This situation can be translated with the following expression:

COS1 corresponds to tpd1 . . . tpd4, attributes for COS1,

COS2 corresponds to tpd5 . . . tpd7, attributes for COS2, etc.

Therefore, decoupling the Class of Service from the potential variation of the policies gives the whole model a great dimension of flexibility.

An ADA receives a certified list of classes of service (COS1, COS2, COS5, COS7, COS8) from the SDA as an authenticated delegation to assign the cryptography.

Figure 5:
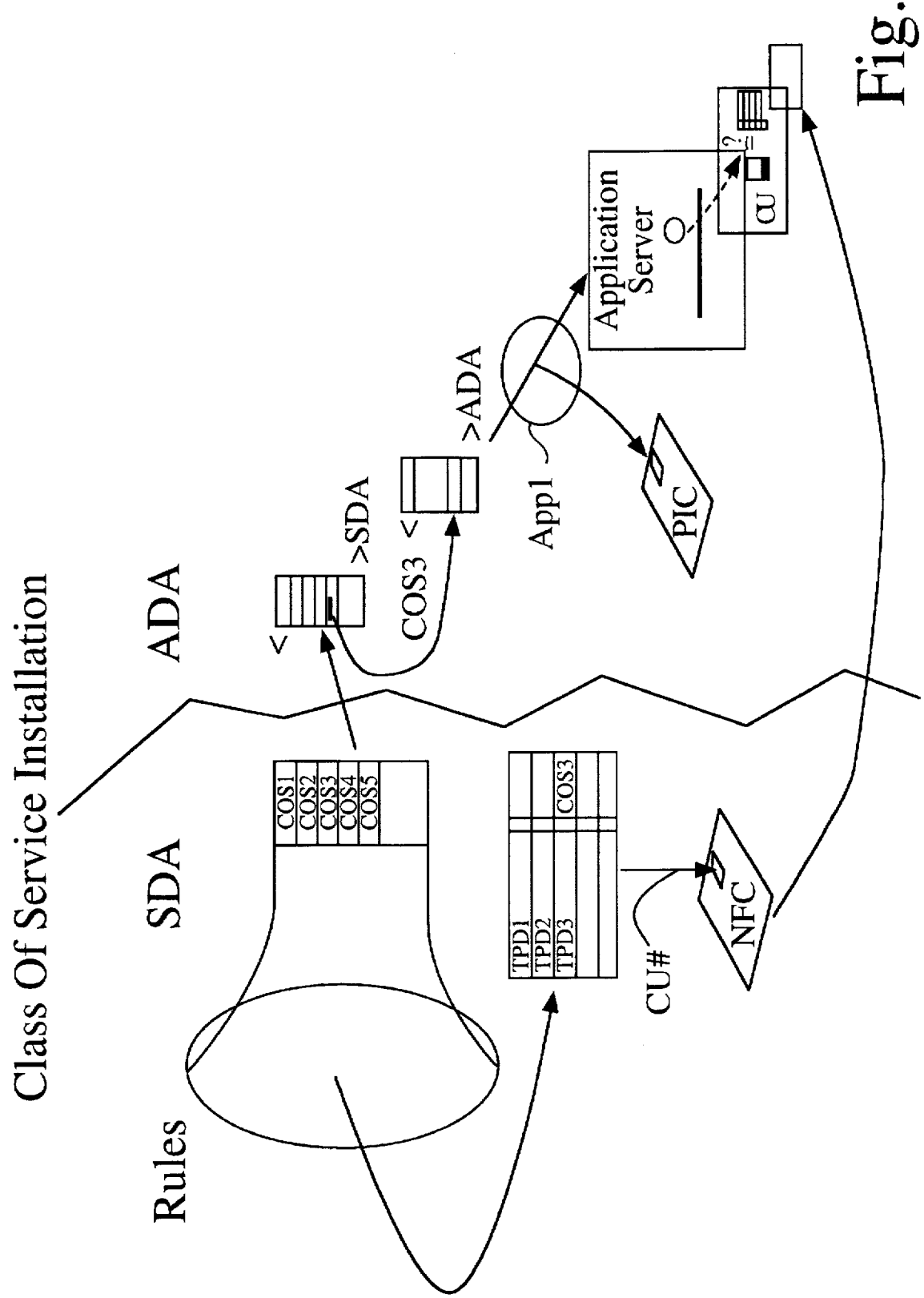
FIG. 5 is a schematic diagram showing a class of service installation according to the invention.

FIG. 5 is a schematic diagram showing a class of service installation according to the invention. The figure illustrates the relation between the COS, the TPD, the ADA, and the SDA (as discussed above).

The relations between the ADA and the SDA

Figure 6:
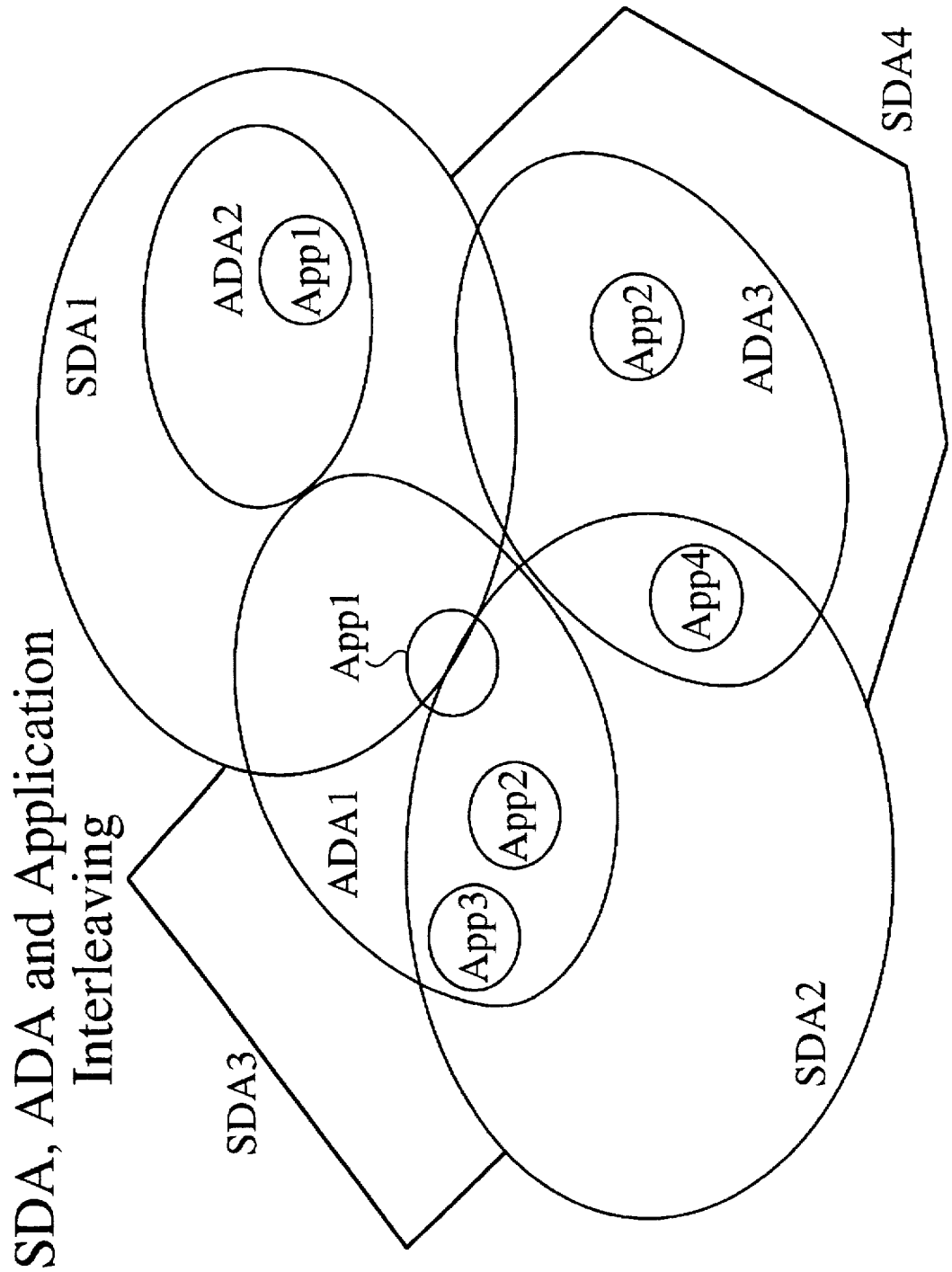
FIG. 6 is a schematic diagram showing security domain authority, application domain authority, and application interleaving according to the invention.

FIG. 6 is a schematic diagram showing security domain authority, application domain authority, and application interleaving according to the invention. The SDA issues a token (various standards may apply as instances of the token) with the certified classes of services to the ADAs which are within its jurisdiction, as shown by the circle surrounding each SDA. Such a jurisdiction could eventually be spanned between multiple countries or groups (e.g. NAFTA, EC, or G7). For example, tokens of that nature might create the default values for the international communications. The fundamental value of this delegation is that an application can be generated and distributed within an application domain without any prior request to the SDA for a given level of cryptography.

Operation Stage

The TPD Life Cycle coupled to the NFC

Figure 7:
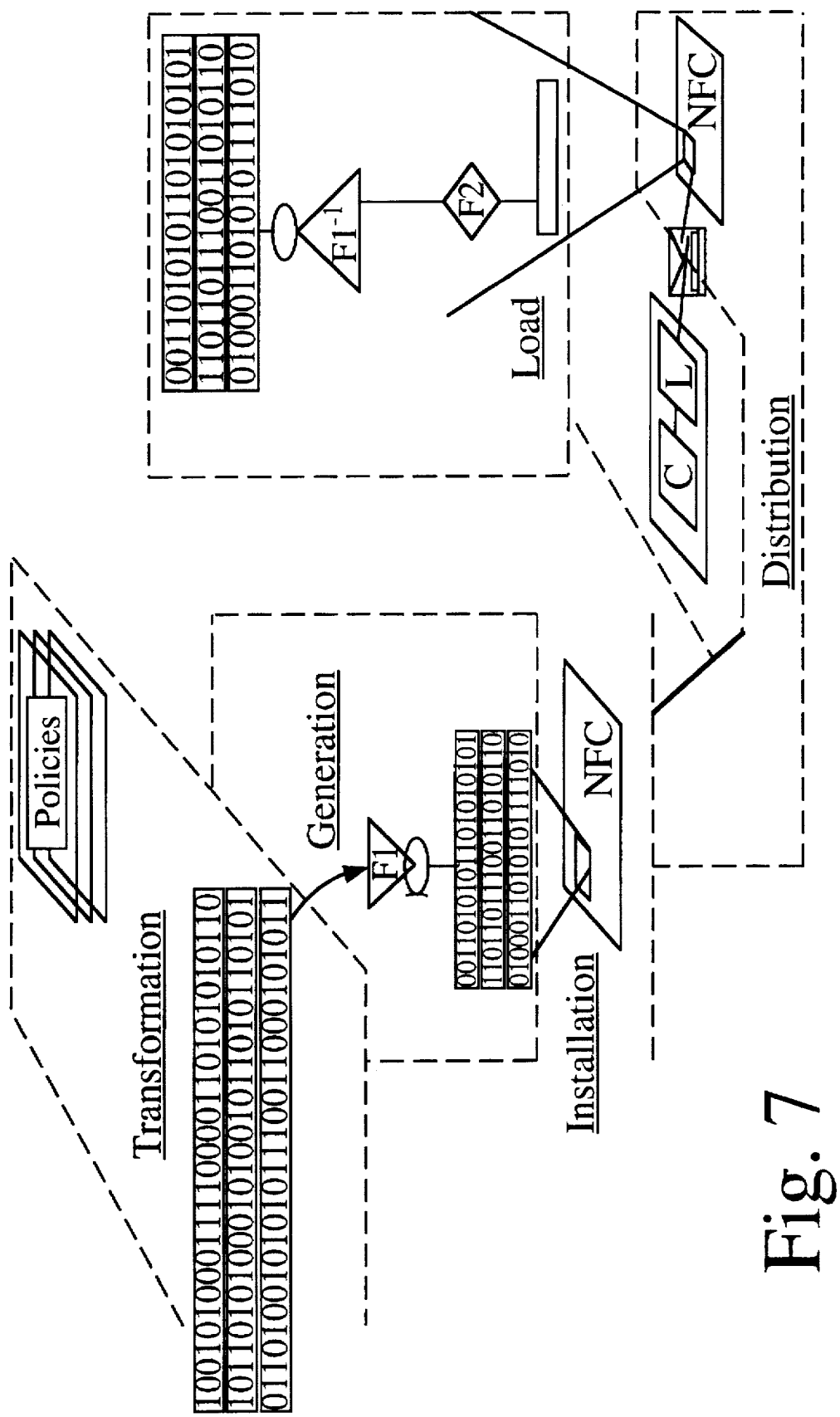
FIG. 7 is a schematic diagram showing a touch point data life cycle, including generation, installation/distribution, and load, according to the invention.

FIG. 7 is a schematic diagram showing a touch point data life cycle, including generation, installation/distribution, and load, according to the invention.

As shown on FIG. 7, a tpd life cycle is decomposed into four major phases:

Generation

Figure 8:
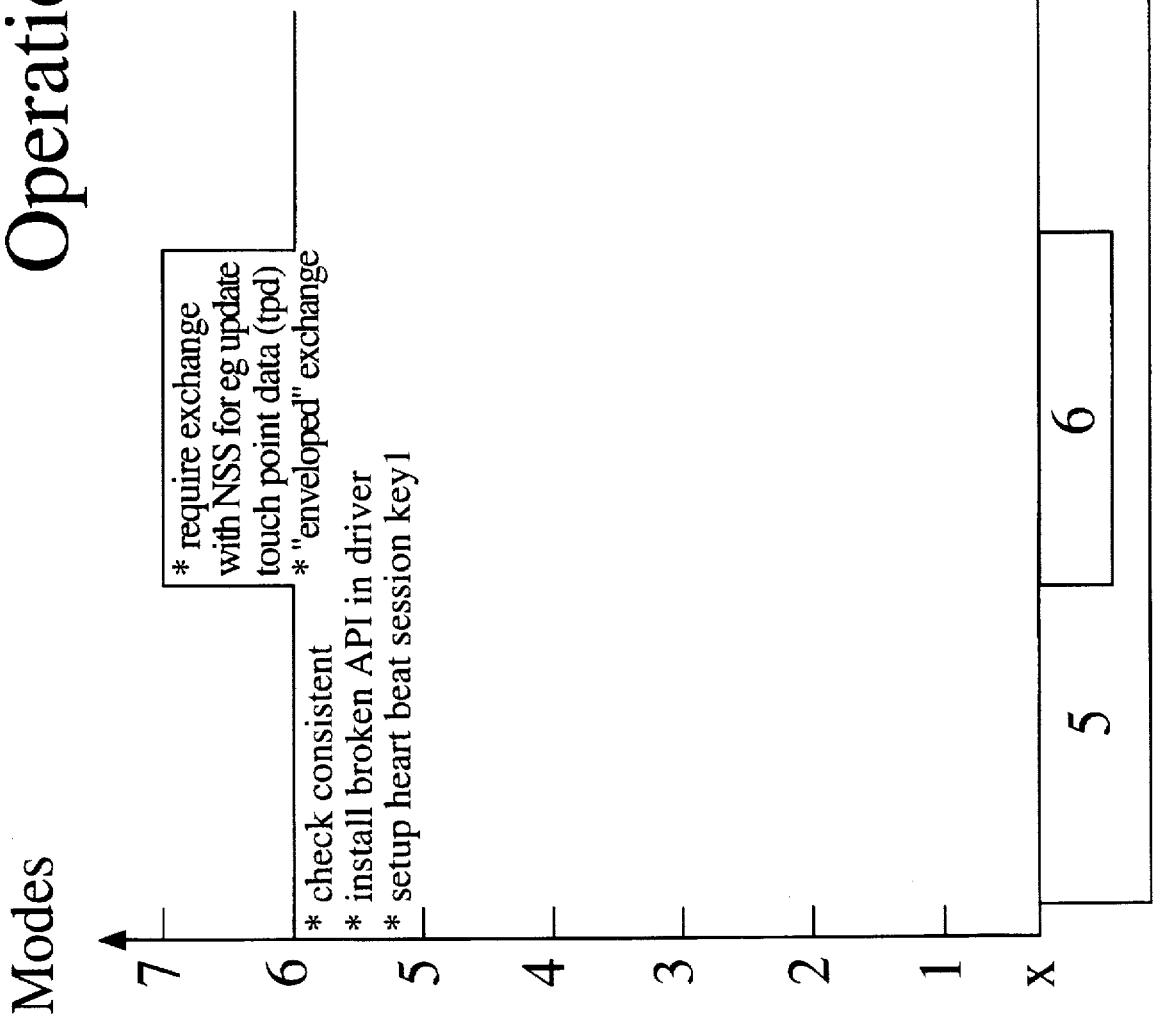
FIG. 8 is a timing diagram showing behavior of a crypto unit during an operation stage according to the invention.

The tpd is generated by the domain authority at two different security stages in the life cycle:
- First at the manufacture and distribution stage of the NFC; and
- Second at the operation stage by the NSS (as shown on FIG. 8).

Installation

The result of the generation function is immediately installed into the NFC at personalization time during the manufacture and distribution stage.

Update/Replacement

Figure 9:
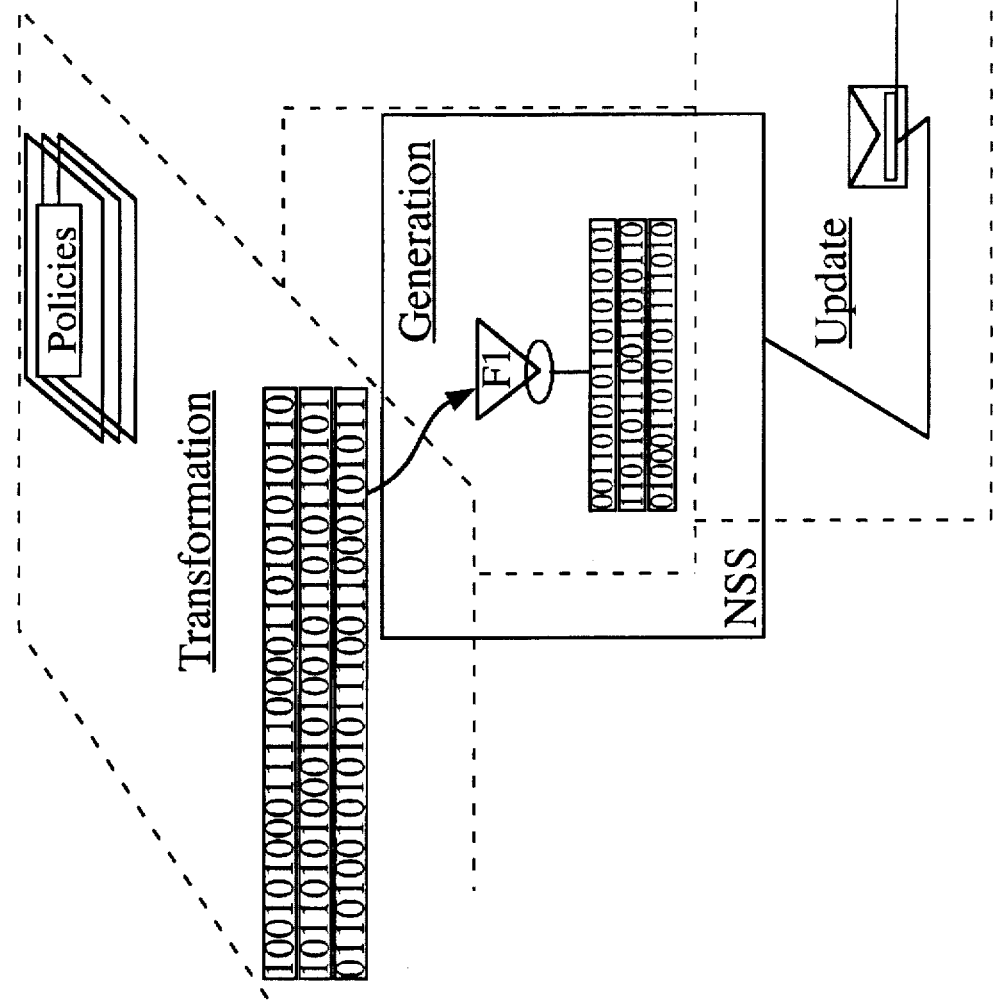
FIG. 9 is a schematic diagram showing a touch point data life cycle, including an update, according to the invention.

FIG. 9 is a schematic diagram showing a touch point data life cycle, including an update, according to the invention.

As shown on FIG. 9, the NSS responsible for the generation of a new version of the policy rules transfers the result back to the CU over the network only during the operation stage.

Cryptographic Unit details—Functional Elements

Figure 10:
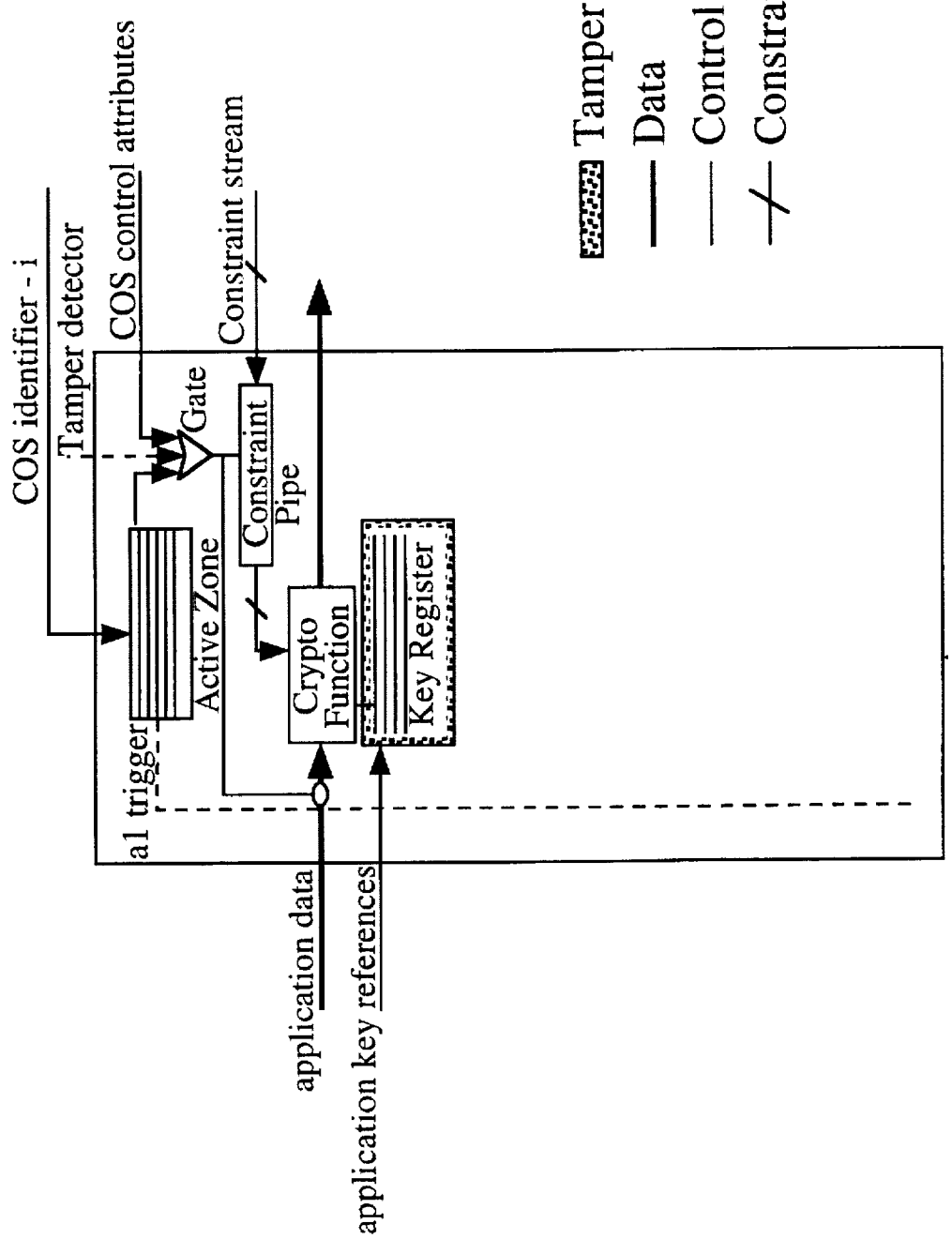
FIG. 10 is a schematic diagram showing the functional elements of a cryptographic unit according to the invention.

FIG. 10 is a schematic diagram showing the functional elements of a cryptographic unit according to the invention. These elements of the invention are discussed in greater detail below.

Load

Figure 11:
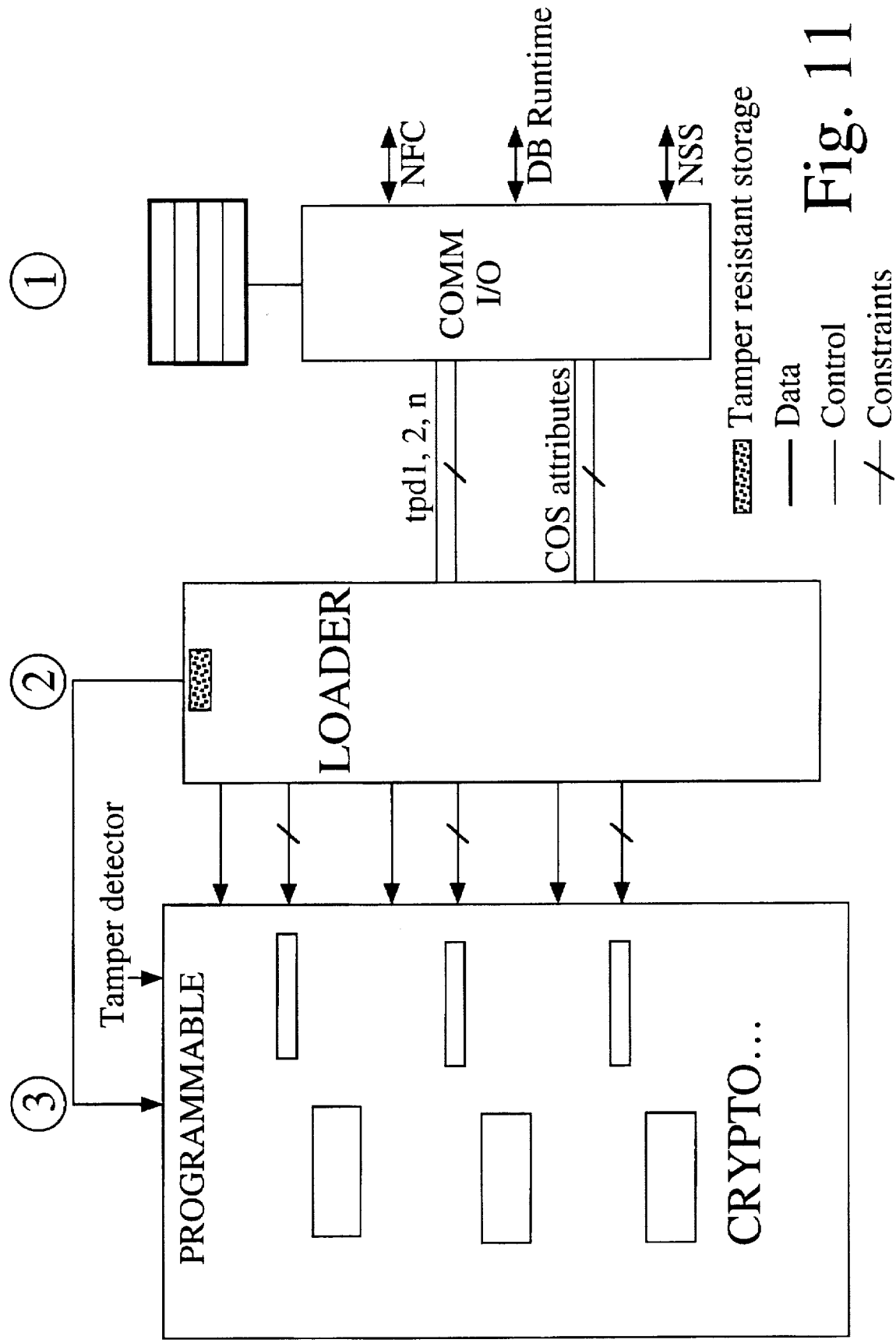
FIG. 11 is a schematic diagram showing a load sequence according to the invention.

FIG. 11 is a schematic diagram showing a load sequence according to the invention. At the time that the NFC finishes the challenge with the CU, the COS per application is installed into the loader, and decrypted before it is pushed into the gates. Once the logic is activated, the heartbeat enables the connections between the composing elements and the encryption methods are ready to be executed.

It should be appreciated by those skilled in the art that methods may be loaded into the CU in many different ways. Because the method can be loaded from any elements in the ICF based upon authorization of any combination of trusted elements, such loading may be thought of as dynamic. For example, the host system may load a method into the CU, the NSS may load a method into the CU, or the policy may load a method into the CU, all under supervision of the policy. Further, the methods may be resident in the CU in a dormant state, where any of several methods are activated by trusted elements of the ICF, e.g. the policy or the NSS.

Functional details

The CU switches in its secure mode 4—step 4 (see FIG. 4). The following interactions take place between the three functional elements (see FIG. 11). For this figure, as well as for FIGS. 12 and 13, each step in a sequence of operation is indicated on the figure by an encircled number, which identifies the location on the figure of the action that is being explained. FIGS. 10-13 include a legend at the lower right hand corner thereof that identifies a tamper resistant area, data, control, and constraints. Note that this legend is provided for similar purposes as that set forth on FIGS. 2 and 3 (discussed above), but that the symbols are not identical to those of FIGS. 2 and 3.

STEP 1

The envelopes used during the session key set up are handled in the Comm-I/O element. Then, the relevant COS are extracted from the envelope, and the encrypted tpds are first split into cryptographic-controls and class of service attributes before they are pushed into the Loader element.

STEP 2

The loader activates the Dynamic State enabling Logic per gate—one by one—with specific execution and timing constraints and programmatic connection sequences to lock temporarily the cryptographic mechanisms.

STEP 3

Once all tpd are installed, the loader locks the constrained accesses of the dynamic state enabling logic. The CU loader then generates installation control sequences that are interpreted in the systems kernel by the secure loader. Two sequences are sent for the CU driver (Re-Install Driver, Calculate Signature) and two sequences are sent for the DB runtime (Re-Install Runtime, Calculate Signature).

The generated hash value of the re-installed driver is sent back to the CU loader which then verifies against the DB runtime signature. When both are correct signatures, the applications can invoke cryptographic services.

TPD Load—Flow of events

Figure 12:
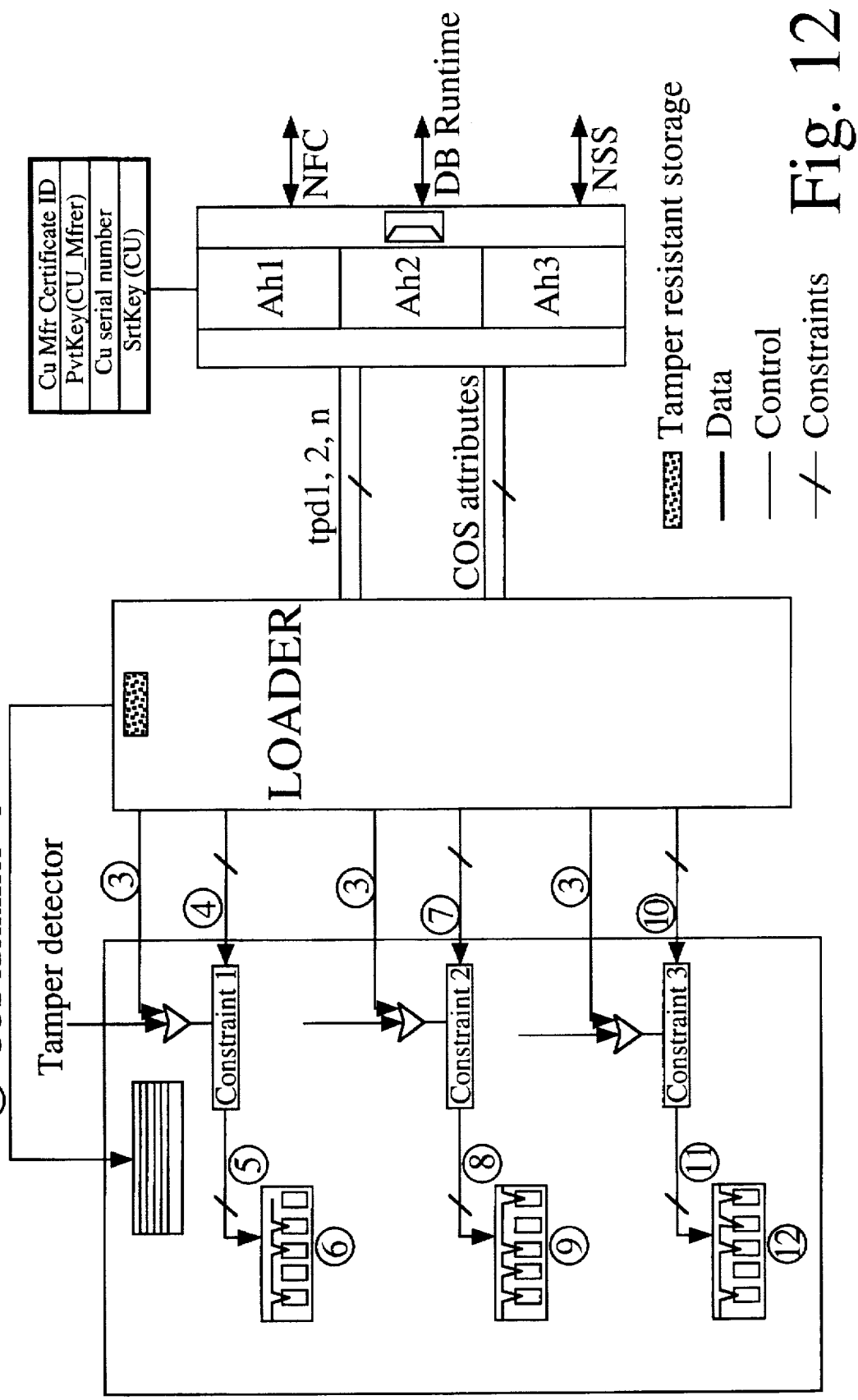
FIG. 12 is a schematic diagram showing a flow of events for a touch point data load sequence according to the invention.

The following section focuses on the steps required and actions executed by the three functional elements to translate the tpdi into a set of rules applicable to the CU's cryptographic modules. FIG. 12 is a schematic diagram showing a flow of events for a touch point data load sequence according to the invention.

STEP 1

After the session keys have been set up and the heartbeat between the two elements is synchronized, the NFC transfers all the tpdi's related to all COS's, one by one, into the communication element.

STEP 2

COS's attributes and the tdpi's are extracted from the contents of the envelope. Such attributes can include, for example the type of algorithm, the number of uses, or the date of expiration, but also such operations as, for example translate the rule, use a symmetric key algorithm with a 168 bit escrowed or non-escrowed key length. The constraint streams within the tdpi in the preferred embodiment of the invention are how the keys are escrowed, or under which scheme, as an eample.

STEP 3

It is the loader's role to push the COS identity into the COS active zone and the result of the date validity check and constraints information into the constraint gate.

STEP 4

The constraints cipher bit stream are only now pushed in the clear into the constraint pipe.

STEP 5

The clear bit stream which is the outcome of the constraint pipe using a n-step permutation is used to program the cryptographic module.

STEP 6

As an example, the cryptographic module is programmed as triple-DES and is ready to accept a 168 key length to run the encryption. Once step 6 is achieved, the loader waits for an acknowledge from the module 1 before it proceeds to module 2.

STEP 7

If for any chance module 2 should not be activated for COS's, the pipe is empty and forces a no programming state.

STEPS 8-12

Continue as for constraint 1 (STEPS 4-6) for all other COS's.

Applications use—Flow of events

Figure 13:
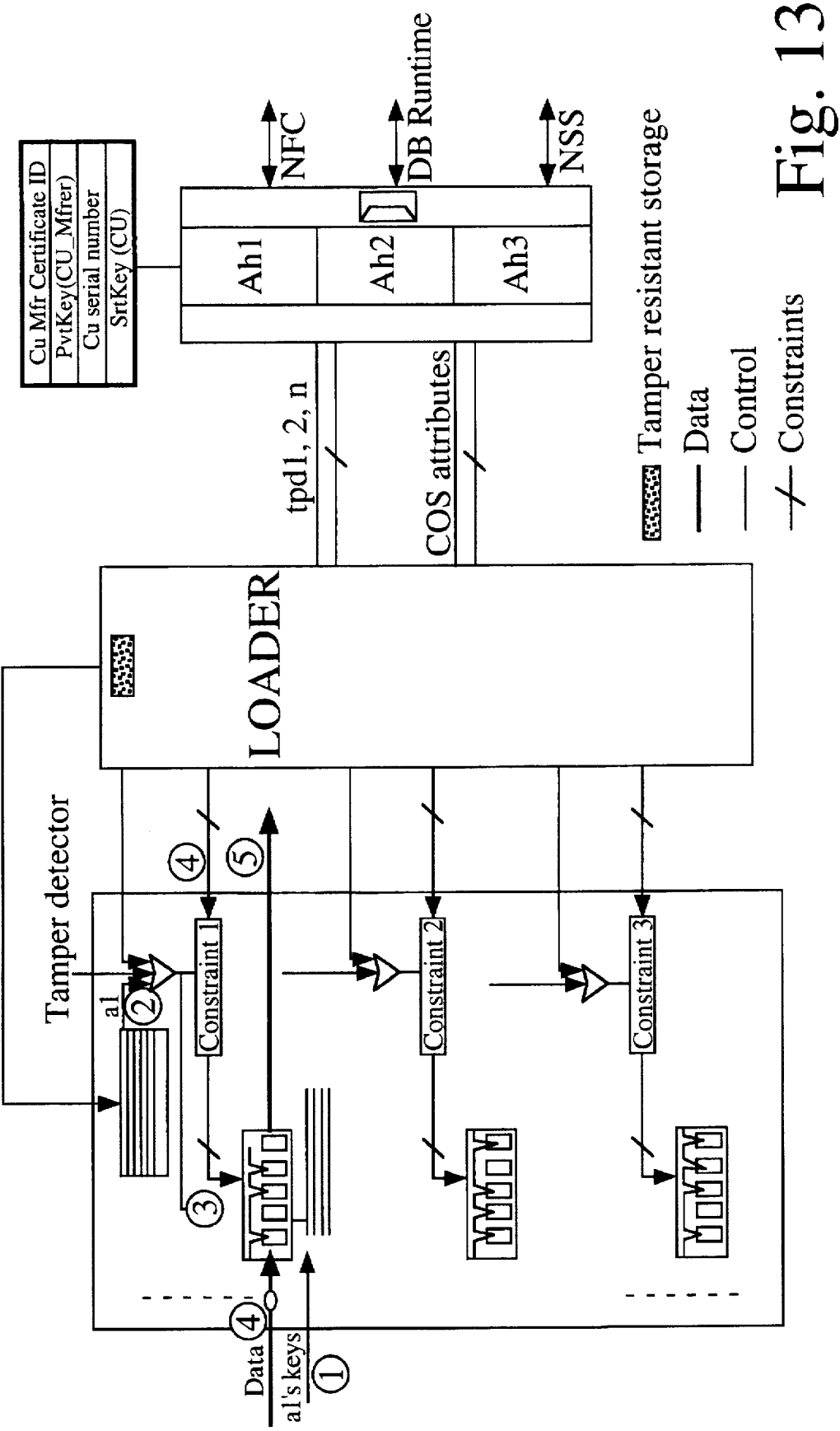
FIG. 13 is a schematic diagram showing a flow of events for an application a1 that uses a cryptographic function 1 according to the invention.

FIG. 13 is a schematic diagram showing a flow of events for an application a1 that has the right to use a cryptographic function 1 according to the invention: its signed request includes a COS ID that matches those installed in the CU. Application a1 has the right to execute the cryptographic functions. Another application requesting another COS must be queued to get access to those cryptographic functions.

STEP 1

Application a1 presents the keys to be used or selects an index to retrieve the keys to be used for the cryptographic run.

STEP 2

Presentation of the keys triggers the a1 identity to be presented to the constraint gate. If the time and date of use or the number of uses still matches with the set control information, the outcoming signal enables the next step to occur. If all of the conditions are not met, the data presented are not visible to the cryptographic module.

STEP 3

This signal opens/closes the input data stream.

STEP 4

The data bulk is run through the cryptographic module which now encrypts it with the key selected in Step 1 above.

STEP 5

The result is presented to the application a1 in a data zone.

Decay Function

Each of these messages sent between the cryptographic unit and the policy is encrypted using a key that is constantly changing. This allows the system to create a progression that cannot be interfered with because the key is always changing. The value $k_i$ (where $k_i$ is one of the messages) is equal to a function of the session sequence number (RN). These messages began with a random point, e.g. 1010, which is a random number that was the first sequence number sent between the policy and the cryptographic unit. The policy sends a response to the cryptographic unit which increments the number, i.e. 1011. The system continues sequencing from this random point. The function of the value $k_i$ is a function of that random number and k, where k is determined during the initialization phase (as discussed above) and is a unique key that the policy and cryptographic unit now both share.

To know the key at any point $k_i$, or to predict that key, it is necessary to know the serial number of the message, RN, and k, the original number. Additionally, the function has a decay value. For example, suppose the policy and cryptographic unit have been in communication for quite a while and are up to the number 2084, i.e. the value of RN. Where an interloper has captured a lot of the messages and wants to come back and get the first message, if the value substituted is more than a delta of 10 away from the actual number, the function does not work. Thus, $k_i$ is only valid when RN is less than or equal to 10 from RN.

With the decay function, the policy and cryptographic unit may be passing a message of any type that is encrypted using $k_i$. It may be possible with a brute force attack on one message to go off and work for five days and break one message to get $k_i$. However, that was what the key was two days ago. Knowledge of that key and even knowledge of this function cannot be reversed to identify the value of k. Even if k and $k_i$ are known, the value calculated is more than 10 off from current value.

A value such as 10 is chosen in the preferred embodiment of the invention because a legitimate system could fall out of synch by a jitter due to, for example a power failure or if someone snaps the policy out just before they were able to update the number in their static RAM. Suddenly the system is powered back on, but the system never goes back to zero again. When the system is powered back on, it is expected that the system starts off with $k_i$. However, that value could be off, so the number is modifiable in the algorithm, e.g. by 10.

An important aspect of the invention is that the system trusts the policy, but does not really trust the cryptographic unit. Every now and then the policy may change the sequence number. Thus, the policy may normally increment the sequence number by one, and then every now and then it issues another random number. When it does that, the cryptographic unit receives the number in the message because the message would have been encrypted using $k_i$, which synchronizes the system. When suddenly the other side sees the sequence number jump, the message received is valid because it was in the stream, it was encrypted with the right next key, only the sequence number is taking a jump. The cryptographic unit follows that jump because its about to send a message back to the policy. So, the system intentionally jumps over the decay value, e.g. 10, periodically just in case the value was decrypted before the tenth message. This jump only comes from the policy. A cryptographic unit knows that from time to time there is going to be a jump, but if the policy ever sees a jump it is going to work. Further, the interval for the jump can be totally random and the amount of jump can be up or down or any which way.

Cryptographic Modules

Principles

EXAMPLE 1

TouchPoint Data disables the use of an algorithm.

The policy card enabled firmware is structured in a layer way, installed in layer 1, that disallows the access to the algorithm. Specific code related to this function tests the application's certificate to determine if it matches the COS currently installed. If the COS and the certificate contents match, then execution occurs; if there is no match, then the request is rejected.

EXAMPLE 2

TouchPoint Data enforces the use of a 128 bits key length for a specific algorithm.

Install a filtering mechanism in layer 1 that enables control flow.

Provide access to a key load mechanism that performs an active check on the key length. The following should happen:

If the key length y is greater than x, x specified by the policy card, then return an error indicating that the existing policy does not allow the system to work with length y.

At this point only a secret key based system would allow the CU to continue. However, this is questionable because the peer entities have not yet synchronized on that specific new key.

The asymmetric algorithm is much simpler because no equivalent key pair can be generated without a notification or installation of an element of the pair.

No action can be taken.

Keeping the policy enforced.

An important part of the ICF is the NFC-CU relationship. It is necessary to keep the heartbeat working with the challenges between the CU and NFC synchronized. The NSS may change these policies after an enveloped challenge.

Enforcing the use of a key escrowing scheme.

Layer 1 in one implementation is the place where specific firmware is installed to execute the scheme again at the time the key is loaded. Layer 3 plays the role of the key breaker.

Layer 1 is the place where specific default functions are executed: default symmetric/asymmetric algorithms plus encryption key length, default signature generation and verification algorithms, and a default escrowing scheme.

COS ATTRIBUTE MANAGEMENT

The COS attribute, part of the TouchPoint Data, may consist of the following information:

Algorithm type (DES, triple DES, RSA, . . . ),

Key length,

Maximum number of uses, and

Expiration date.

This list is not exhaustive, and it is quite important that some flexibility is maintained at this level. For this reason, the processing and checking of the attributes should be performed at Protected Layer 1 level.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A cryptographic unit, comprising:
   at least one cryptographic method that is disabled in one or more predetermined ways at a plurality of touch points; and
   dynamic state enabling logic at each touch point that forms a touch point gate which requires regular reconfiguration to maintain said touch points in an enabled state.

2. The cryptographic unit of claim 1, further comprising:
   touch point data associated with said touch points to provide parametric control over the functioning of each touch point.

3. The cryptographic unit of claim 1, wherein each cryptographic method is controlled by several touch points within that method.

4. The cryptographic unit of claim 1, wherein all of the touch point gates for a given cryptographic method must be in an enabled state to activate that method.

5. The cryptographic unit of claim 1, further comprising:
   a touch point heartbeat established between said cryptographic unit and a policy for providing dynamic, constant refresh and state determination for said cryptographic unit.

6. A cryptographic method, comprising the steps of:
   providing at least one cryptographic method that is disabled in one or more predetermined ways at a plurality of touch points; and
   providing dynamic state enabling logic at each touch point that forms a touch point gate which requires regular reconfiguration to maintain said touch points in an enabled state.

7. The method of claim 6, further comprising the step of:
   providing touch point data associated with said touch points to assert parametric control over the functioning of each touch point.

8. The method of claim 6, wherein each cryptographic method is controlled by several touch points within that method.

9. The method of claim 6, wherein all of the touch point gates for a given cryptographic method must be in an enabled state to activate that method.

10. The method of claim 6, further comprising the step of:
    establishing a touch point heartbeat between said cryptographic unit and a policy for providing dynamic, constant refresh and state determination for said cryptographic unit.

11. A cryptographic unit, comprising:
    at least one cryptographic method that is disabled in one or more predetermined ways at a plurality of touch points, wherein each cryptographic method is controlled by several touch points within that method; and
    dynamic state enabling logic at each touch point that forms a touch point gate which requires regular reconfiguration to maintain said touch points in an enabled state.

12. The cryptographic unit of claim 11, further comprising:
    touch point data associated with said touch points to provide parametric control over the functioning of each touch point.

13. The cryptographic unit of claim 11, wherein all of the touch point gates for a given cryptographic method must be in an enabled state to activate that method.

14. The cryptographic unit of claim 11, further comprising:
    a touch point heartbeat established between said cryptographic unit and a policy for providing dynamic, constant refresh and state determination for said cryptographic unit.

15. The cryptographic unit of claim 11, wherein said cryptographic unit is adapted for operation in an international cryptography framework that has four service elements, each offering different types of services, wherein said service elements comprise a policy, said cryptographic unit, a host system, and a network security server.

16. The cryptographic unit of claim 15, wherein said cryptographic unit does not provide any cryptographic functions in the absence of said policy.

17. The cryptographic unit of claim 15, wherein said policy sets appropriate touchpoint data at various points associated with a class of service to enable any of a plurality of cryptographic classes of service.

18. The cryptographic unit of claim 11, further comprising:
    a challenge/response mechanism for securing communications between said cryptographic unit and an enabling policy.

19. The cryptographic unit of claim 18, further comprising:
    a decay function for dynamically altering a challenge/response key.

20. The cryptographic unit of claim 19, said decay function further comprising:
    means at said policy for randomly altering said challenge/response key.

21. The cryptographic unit of claim 19, said decay function further comprising:
    a fixed value offset that defines a range of acceptable values for said challenge/response key.

22. The cryptographic unit of claim 18, wherein said challenge/response mechanism is non-repeating and/or non-predictable.

23. The cryptographic unit of claim 11, further comprising:
    a certificate mechanism for authenticating said cryptographic unit.

24. The cryptographic unit of claim 23, wherein said certificate mechanism is non-repeating and/or non-predictable.

25. The cryptographic unit of claim 23, wherein said certificate mechanism implements a privilege hierarchy.

26. The cryptographic unit of claim 11, wherein said method is dynamically loaded into said cryptographic unit.

27. The cryptographic unit of claim 11, wherein at least one said method is resident in said cryptographic unit and dormant until activated by said policy.

28. The cryptographic unit of claim 11, wherein said cryptographic unit comprises an initialization attribute.

29. The cryptographic unit of claim 28, wherein said cryptographic unit is functionally destroyed by alteration of said initialization attribute.

30. A cryptographic method, comprising the steps of:
    providing a cryptographic unit having at least one cryptographic method that is disabled in one or more predetermined ways at a plurality of touch points, wherein each cryptographic method is controlled by several touch points within that method; and providing dynamic state enabling logic at each touch point that forms a touch point gate which requires regular reconfiguration to maintain said touch points in an enabled state.

31. The cryptographic method of claim 30, further comprising the step of:

providing parametric control over the functioning of each touch point with touch point data associated with said touch points.

32. The cryptographic method of claim 30, wherein all of the touch point gates for a given cryptographic method must be in an enabled state to activate that method.

33. The cryptographic method of claim 30, further comprising the steps of:

establishing a touch point heartbeat between said cryptographic unit and a policy for providing dynamic, constant refresh and state determination for said cryptographic unit.

34. The cryptographic method of claim 30, wherein said cryptographic unit is adapted for operation in an international cryptography framework that has four service elements, each offering different types of services, wherein said service elements comprise a policy, said cryptographic unit, a host system, and a network security server.

35. The cryptographic method of claim 34, wherein said cryptographic unit does not provide any cryptographic functions in the absence of said policy.

36. The cryptographic method of claim 34, wherein said policy sets appropriate touchpoint data at various points associated with a class of service to enable any of a plurality of cryptographic classes of service.

37. The cryptographic method of claim 30, further comprising the step of:

providing a challenge/response mechanism for securing communications between said cryptographic unit and an enabling policy.

38. The cryptographic method of claim 37, further comprising the step of:

dynamically altering a challenge/response key with a decay function.

39. The cryptographic method of claim 38, further comprising the step of:

randomly altering said challenge/response key with said decay function.

40. The cryptographic method of claim 38, further comprising the step of:

providing a fixed value offset that defines a range of acceptable values for said challenge/response key.

41. The cryptographic method of claim 37, wherein said challenge/response mechanism is non-repeating and/or non-predictable.

42. The cryptographic method of claim 30, further comprising the step of:

authenticating said cryptographic unit with a certificate mechanism.

43. The cryptographic method of claim 42, wherein said certificate mechanism is non-repeating and/or non-predictable.

44. The cryptographic method of claim 42, wherein said certificate mechanism implements a privilege hierarchy.

45. The cryptographic method of claim 30, wherein said method is dynamically loaded into said cryptographic unit.

46. The cryptographic method of claim 30, wherein at least one said method is resident in said cryptographic unit and dormant until activated by said policy.

47. The cryptographic method of claim 30, wherein said cryptographic unit comprises an initialization attribute.

48. The cryptographic method of claim 47, wherein said cryptographic unit is functionally destroyed by alteration of said initialization attribute.

* * * * *